US008326707B2

(12) United States Patent
Fan et al.

(10) Patent No.: US 8,326,707 B2
(45) Date of Patent: Dec. 4, 2012

(54) METHODS AND SYSTEMS FOR PROVIDING WIRELESS ENABLED INVENTORY PEERING

(75) Inventors: James Fan, San Ramon, CA (US);
Vimal Begwani, Holmdel, NJ (US);
Richard Kuo, Mountain View, CA (US);
Stephen Kurpinsky, Martinez, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 659 days.

(21) Appl. No.: 12/575,947

(22) Filed: Oct. 8, 2009

(65) Prior Publication Data

US 2011/0087565 A1    Apr. 14, 2011

(51) Int. Cl.
*G06Q 10/00* (2006.01)
(52) U.S. Cl. ....... 705/28; 705/7.11; 705/7.12; 705/7.13; 235/382; 235/385
(58) Field of Classification Search ........ 705/7.11–7.13, 705/28; 235/382, 385, 375, 383
See application file for complete search history.

(56) References Cited

U.S. PATENT DOCUMENTS

| | | | |
|---|---|---|---|
| 6,845,909 B2 * | 1/2005 | Bong et al. ............... | 235/385 |
| 7,055,741 B2 * | 6/2006 | Bong et al. ............... | 235/382.5 |
| 7,770,792 B2 * | 8/2010 | Bruns et al. ............... | 235/385 |
| 7,996,284 B2 * | 8/2011 | Bar et al. ............... | 705/28 |
| 2002/0019699 A1 * | 2/2002 | McCarty et al. ............... | 701/211 |
| 2004/0084527 A1 * | 5/2004 | Bong et al. ............... | 235/385 |
| 2004/0100650 A1 * | 5/2004 | Landau et al. ............... | 358/1.14 |
| 2005/0103842 A1 * | 5/2005 | Bong et al. ............... | 235/385 |
| 2005/0289020 A1 * | 12/2005 | Bruns et al. ............... | 705/28 |
| 2006/0276204 A1 * | 12/2006 | Simpson et al. ............... | 455/456.5 |
| 2007/0016496 A1 * | 1/2007 | Bar et al. ............... | 705/28 |
| 2007/0043634 A1 * | 2/2007 | Bar et al. ............... | 705/28 |
| 2007/0152049 A1 * | 7/2007 | Bar et al. ............... | 235/385 |
| 2008/0027772 A1 * | 1/2008 | Gernega et al. ............... | 705/7 |
| 2008/0314981 A1 * | 12/2008 | Eisenson ............... | 235/385 |
| 2009/0012882 A1 * | 1/2009 | Sarangapani et al. ............... | 705/28 |
| 2009/0049057 A1 * | 2/2009 | Ghani ............... | 707/10 |
| 2010/0153165 A1 * | 6/2010 | Kosseifi et al. ............... | 705/9 |
| 2010/0265061 A1 * | 10/2010 | Harmon et al. ............... | 340/539.13 |

* cited by examiner

*Primary Examiner* — Scott Zare
*Assistant Examiner* — Olusegun Goyea
(74) *Attorney, Agent, or Firm* — Parks IP Law LLC; Mickki D. Murray, Esq.

(57) ABSTRACT

Systems and methods for providing wireless enabled inventory peering are disclosed. According to one embodiment, a system for providing wireless enabled inventory peering includes a wireless enabled inventory peering vehicle system (WEIPVS). The WEIPVS is configured to receive an inventory search request. In response to receiving the inventory search request, the WEIPVS searches inventories of proximate technician vehicles. If a needed inventory item is located in an inventory of a proximate technician vehicle, the WEIPVS generates a request for an inventory transfer and sends the request to the proximate technician vehicle. When the item is received at the WEIPVS, the WEIPVS updates the inventory associated with the WEIPVS.

20 Claims, 4 Drawing Sheets

METHODS AND SYSTEMS FOR PROVIDING WIRELESS ENABLED INVENTORY PEERING

TECHNICAL FIELD

The present disclosure relates generally to inventory control and, more particularly, to methods and systems for providing wireless enabled inventory peering.

BACKGROUND

Telecommunications services are becoming more sophisticated and more commonplace. Many telecommunications services are based upon the transmission of voice and/or data. When such services are purchased, the installation of a variety of Customer Premises Equipment (CPE) may be required. The CPE is provided and/or installed at a customer location, for example, a home, office, and/or place of business, often by a technician hired or contracted by the company providing telecommunications services.

A technician often travels to an installation site to provide and/or install the CPE needed to provide the services purchased and/or ordered. As such, a technician often needs to have access to a varied assortment of CPE's and/or accessories. Technicians often travel to the installation site in a vehicle such as, for example, a van, pickup truck, or commercial vehicle, and stock the vehicle with the supplies needed for a time frame, for example, that day, that week, or the like. While installing the requested telecommunications services, technicians often upsell additional products and/or services to the customers. As such, technicians often stock their vehicles with additional supplies, e.g., CPE's and/or accessories. If a customer is interested in the additional products and/or services, the technician can find the needed CPE's and/or CPE accessories in the vehicle and provide the additional products and/or services.

It is possible, however, that a technician provides a first customer with a CPE for an upsold product and/or service, and then experiences a shortage of the CPE at an installation site of a second customer. If the technician is far away from a supply point, e.g., a garage, a warehouse, or other facility, and encounters such an inventory shortage, the technician may need to travel to the supply point to get the necessary CPE's and/or accessories to complete a job assignment. In such circumstances, the technician may miss the appointment window while driving to and/or from the supply point.

In some inventory management models, dispatch center staffing and systems primarily manage inventory for technicians. Technology deployment and improvement are primarily directed to improving operational efficiencies to create an effective dispatch management mechanism. Based on the overall workload for any particular time period, dispatch center staff adjust technician assignments.

Technicians occasionally communicate with dispatch center staff and/or systems, but such communications are generally directed to reporting a job status, conducting end-to-end testing, remotely resetting firmware and/or user profiles, managing assigned network resources, combinations thereof, and the like. Communication between technicians is generally limited to informal means, for example, a technician maintaining a private contact list through which the technician may contact another technician for assistance, when needed.

SUMMARY

The present disclosure is directed to systems and methods for providing wireless enabled inventory peering (WEIP). Systems and methods in accordance with concepts of the present disclosure introduce a collaborative inventory management system that enables a technician to access inventory associated with one or more other technicians. In some embodiments, the technician is able to reserve and/or acquire inventory associated with another technician.

In some embodiments, the WEIP systems and/or methods allow dispatch center staff and/or systems to maintain full control of technician inventories, i.e., an inventory associated with a first technician, an inventory associated with a second technician, and/or other inventories associated with other technicians. Along with the ability to provide centralized management of technician inventories, the WEIP systems disclosed herein are used by technicians to reserve and/or acquire inventory from other technicians. For example, if a first technician needs CPE's and/or accessories that a second technician has in inventory, the first technician can reserve the CPE's and/or accessories without directly interfacing with the dispatch center staff and/or systems. In some embodiments, however, all communications and/or activities between the first technician and the second technician can be tracked by the dispatch center staff and/or systems.

In accordance with concepts of the present disclosure, systems and methods for allowing a technician with a need for CPE's and/or accessories to review inventories of proximate colleagues' vehicles are provided. In accordance with concepts of the present disclosure, a wireless inventory peering system allows a technician to determine if one or more proximate technician vehicles has excessive inventories with respect to needed CPE's and/or accessories. The present disclosure further describes methods and apparatuses for maintaining the accuracy of all centrally tracked inventories.

As briefly mentioned above, a technician assigned to perform installation and/or repair jobs generally stocks a vehicle with a standard load of CPE's and accessories, e.g., cables, connectors, wiring, replacement parts, and other accessories. There are times, however, that the technician vehicle has insufficient inventory items to complete a particular job assignment. Inventory shortages may occur, for example, due to defective CPE's and/or accessories; completed upsell transactions that created unforeseen demand for CPE's and/or accessories; early completion of scheduled jobs and commencement of a new assignment that requires additional CPE's and/or accessories; a missed customer appointment, e.g., when a customer was not at home, which causes a different job assignment with a different mix of required CPE's and/or accessories; and/or the discovery of unexpected CPE and/or accessory failure(s) at a customer location.

In any of the above situations, as well as in other situations, the technician may need to travel to/from a supply point such as, for example, a garage, a warehouse, and/or another stocking location to restock needed CPE's and/or accessories, which may cause delays. In some such situations, the service installation date may need to be changed to a different date because there may not be enough time to get inventories from a nearby supply point for same-day installation. In such situations, the total operational cost of the installation or repair job will be increased due to added travel and technician time spent on a particular job; the productivity of the technician will decrease; the customer satisfaction rate may decrease; service purchases and/or installations may be cancelled; and/or other adverse effects may be experienced.

The systems and methods disclosed by the present disclosure allow a field technician to review inventories of proximate technician vehicles, search excessive inventories of the proximate technician vehicles, move inventory between technician vehicles, and update centrally managed CPE inventory systems and/or associated systems and/or devices.

In some embodiments of the present disclosure, a technician vehicle is equipped with a WEIP vehicle system (WEIPVS). The WEIPVS includes data storage and processing capabilities, location systems, inventory management systems, wireless communications systems, and/or additional hardware and/or software. The WEIPVS is configured to interface with a technician via input and/or output devices, for example, displays, touch screens, keyboards, mice, multi-touch screens, and/or other devices. In some embodiments, technicians are equipped with a WEIP technician system (WEIPTS) for wirelessly interfacing with the WEIPVS. In some embodiments, the WEIPTS includes a mobile communications device such as, for example, a smart phone, a personal digital assistant (PDA), and/or other devices. In some embodiments, the WEIPTS is used as a remote control for the WEIPVS, enabling the technician to interface with the WEIPVS even if the technician is out of the vehicle.

In some embodiments, the WEIPVS, or the WEIPTS, are configured to communicate with a WIEP central dispatch system (WEIPCDS). The WEIPCDS tracks inventories for all technician vehicles, and updates inventories when inventory is moved between technician vehicles, when inventory is installed at a customer location or other installation point, when inventory is loaded onto a technician vehicle, and/or at other times. In some embodiments of the present disclosure, the WEIPCDS provides a technician with information regarding other technician vehicle inventories, authorizes inventory transfers, and generally provides centralized management for the WEIP system. In some embodiments, the WEIPCDS merely receives updates from technicians and tracks inventory activity, therefore providing a decentralized management system for the WEIP system.

Accordingly, an exemplary embodiment of the present disclosure is directed to a system for providing wireless enabled inventory peering in a communications network. The system includes a first wireless enabled inventory peering vehicle system (WEIPVS). The first WEIPVS is associated with a first technician vehicle and includes a location system, a processor, and a memory configured to store computer-readable instructions. The computer-readable instructions are executable by the processor to make the first WEIPVS operable to receive an inventory search request, and in response to receiving the inventory search request: identify a proximate technician vehicle; search an inventory associated with the proximate technician vehicle; and generate a request for an inventory transfer. The inventory transfer request is a request to move an inventory item from the inventory associated with the proximate technician vehicle to an inventory associated with the first WEIPVS. The computer-readable instructions are executable by the processor to make the first WEIPVS further operable to transfer the request for the inventory transfer to a second WEIPVS associated with the proximate technician vehicle, and in response to receiving the inventory item at the first WEIPVS, update the inventory associated with the first WEIPVS.

In some embodiments, the system includes a wireless enabled inventory peering technician system (WEIPTS). The WEIPTS is communicatively linked with the first WEIPVS for wireless communication between the WEIPTS and the first WEIPVS. In some embodiments, the WEIPTS is a mobile communications device. In some embodiments, the WEIPTS receives input from a technician and transmits the input to the first WEIPVS.

In some embodiments, the WEIPTS includes a display. The WEIPTS receives output from the first WEIPVS and displays at least part of the output on the display. In some embodiments, the system includes a global positioning system (GPS) receiver for obtaining location information corresponding to a current location of the first WEIPVS.

In some embodiments, the first WEIPVS is configured to transfer the location information to the second WEIPVS. In some embodiments, the system further includes instructions, executable by the processor to make the first WEIPVS further operable to receive data indicating that the request for the inventory transfer is accepted, and generate directions from the current location to a location associated with the proximate technician vehicle.

In some embodiments, the system includes a wireless transceiver configured to connect the first WEIPVS with a centralized dispatch center. The centralized dispatch center includes a dispatch management system (DMS) for storing and serving data relating to an order for which resolution requires dispatch of a technician, a consumer premises equipment accessory management system (CPEAS) for storing and serving data relating to a CPE and CPE accessory inventory, and a vehicle location tracking system (VLTS) for storing and serving location information and a network address for a technician vehicle. In some embodiments, the system further includes instructions, executable by the processor to make the first WEIPVS further operable to send an inventory status change message to the CPEAS, and obtain location information relating to the second WEIPVS from the VLTS.

Another exemplary embodiment of the present disclosure is directed to a method for providing wireless enabled inventory peering in a communications network. The method includes receiving, at a first WEIPVS, an inventory search request generated by a technician associated with the first WEIPVS. In response to receiving the inventory search request, the first WEIPVS identifies a proximate technician vehicle and searches an inventory associated with the proximate technician vehicle. The first WEIPVS generates a request for an inventory transfer. The request for the inventory transfer includes a request to move an inventory item from the inventory associated with the proximate technician vehicle to an inventory associated with the first WEIPVS. The method further includes transferring the request for the inventory transfer to a second WEIPVS associated with the proximate technician vehicle and in response to receiving the inventory item at the first WEIPVS, updating the inventory associated with the first WEIPVS.

In some embodiments, the method further includes receiving at the first WEIPVS an input from a technician. The input from the technician is entered at a wireless enabled inventory peering technician system (WEIPTS) and is transmitted to the first WEIPVS from the WEIPTS.

In some embodiments, the method further includes receiving output at the WEIPTS from the first WEIPVS and displaying at least a portion of the output on a display device of the WEIPTS. In some embodiments, the method further includes obtaining location information corresponding to a current location of the first WEIPVS using a global positioning system receiver. In some embodiments, the method further includes receiving data indicating that the request for an inventory transfer is accepted and generating directions from the current location to a location associated with the proximate technician vehicle. In some embodiments, the method further includes sending an inventory status change message to a device associated with a central dispatch center. In some embodiments, the device associated with the central dispatch center is a consumer premises equipment/accessory management system (CPEAS) associated with the central dispatch center.

In some embodiments, the method further includes obtaining location information relating to the second WEIPVS from a second device associated with the central dispatch center. The obtaining the location information includes, in some embodiments, obtaining the location information relating to the second WEIPVS from a vehicle location tracking system (VLTS) associated with the central dispatch center.

In some embodiments, the method further includes determining that the first WEIPVS is unable to establish a communication link with a device associated with a central dispatch center, storing an inventory item status update message in a storage device associated with the first WEIPVS, and transmitting the inventory item status update message to the central dispatch center when the first WEIPVS is able to establish the communication link.

DETAILED DESCRIPTION

Figure 1:
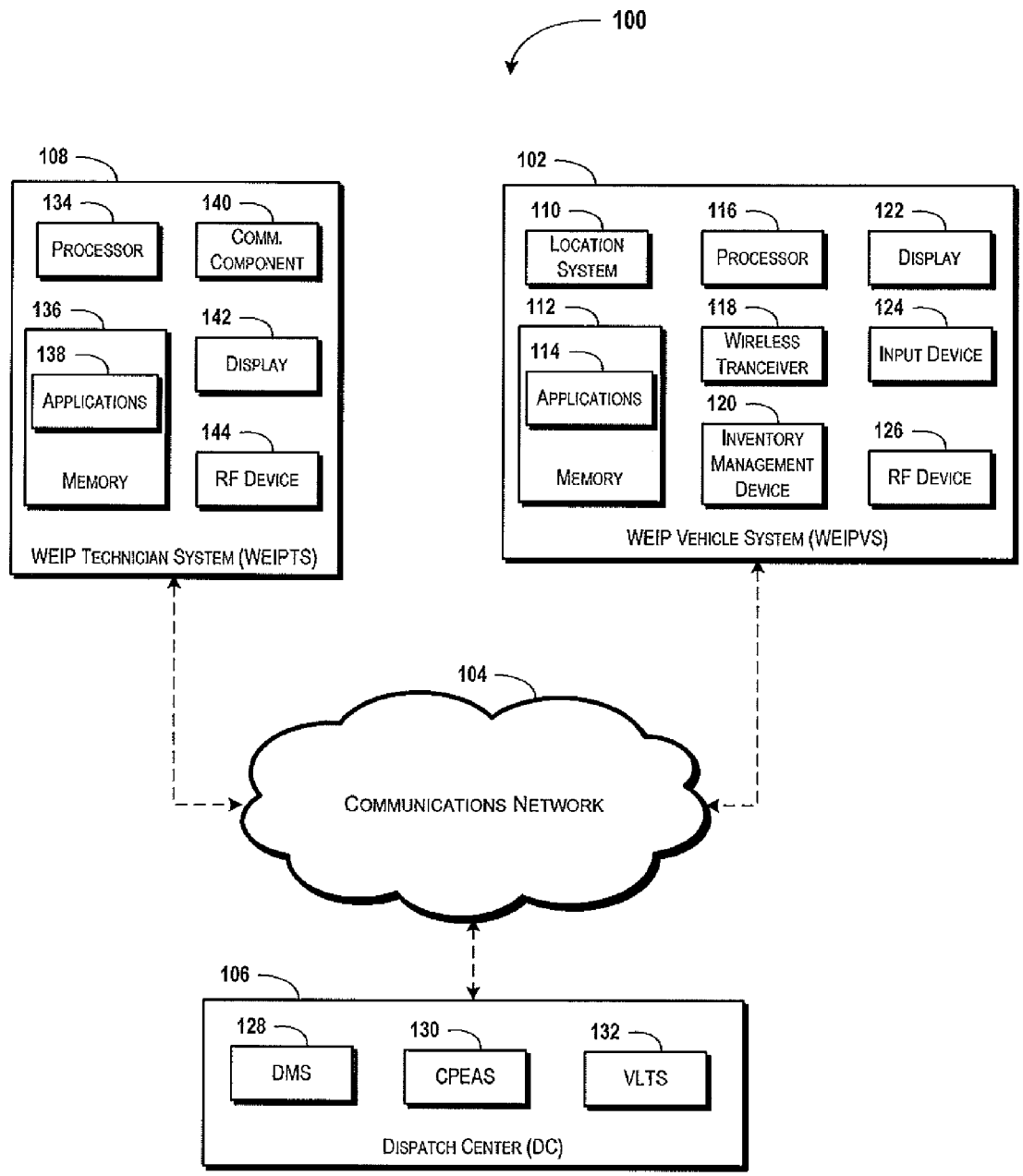
FIG. 1 schematically illustrates a system for providing wireless enabled inventory peering, according to an exemplary embodiment of the present disclosure.

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The term "storage device" and variants thereof, as used in the specification and claims, is used to refer to memory devices, processor registers, processor cache, random access memory (RAM), read only memory (ROM), other volatile memory forms, and non-volatile, semi-permanent or permanent memory types, for example, tape-based media, optical media, flash media, hard disks, combinations thereof, and the like. It should be understood that some embodiments of the "storage device" include a local data storage system and/or a remotely accessed data storage system, for example, a remote hard disk drive, a removable storage medium, a server and/or database operating on and/or in communication with a communications network, combinations thereof, and the like.

The term "computer-readable media" and variants thereof, as used in the specification and claims, is used to refer to volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed and/or executed by a processing system. For purposes of the specification and claims, a "processing system" includes processors, computers, servers, and/or other data processing devices.

The term "application" and variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The term "cellular network" and variants thereof, as used in the specification and claims, is used to refer to cellular communications networks and associated hardware and software. A cellular network includes various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS (General Packet Radio Service) core network components, location service nodes, Internet protocol multimedia subsystem (IMS) components, and the like. In some embodiments, the cellular network also includes radios and nodes for receiving and transmitting voice, data, and combinations thereof to and from radio transceivers, networks, and the Internet. In some embodiments, the cellular network is configured as a 2G GSM (Global System for Mobile communications) network, and is configured to provide data communications via GPRS and EDGE (Enhanced Data rates for GSM Evolution). In some embodiments, the cellular network is configured as a 3G UMTS (Universal Mobile Telecommunications System) network and is configured to provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network is also compatible with new, emerging, and future mobile communications standards including, but not limited to, pre-4G and 4G, for example.

The term "storage location" and variants thereof, as used in the specification and claims, is used to refer to a physical location for a physical object, for example, inventory. As such, a storage location includes, but is not limited to, a delivery truck, a warehouse, a store, a staging area, a manufacturing and/or packing facility, a technician vehicle, a part cart, and/or other locations in which a particular inventory item is held, stored, and/or transferred during the life cycle of the inventory item.

The term "two-way GPS receiver" as used in the specification and claims, is used to refer to a GPS receiver that includes hardware and software for providing the GPS receiver with access to a wireless data connection. In some embodiments, the wireless data connection includes a link established over a cellular communications network operating in accordance with 2G, 3G, and/or 4G protocols and/or improvements thereof. A two-way GPS receiver can provide data to any desired system, for example, a computer, server, network node, and/or other device via the cellular communications network, a packet data network (PDN) such as the Internet, a private network, other networks, combinations thereof, and the like.

FIG. 1 illustrates a wireless enabled inventory peering system 100 (WEIPS), according to an exemplary embodiment of the present disclosure. In some embodiments, the WEIPS 100 includes a WEIP vehicle system 102 (WEIPVS), a communications network 104, a dispatch center (DC) 106, and a WEIP technician system 108 (WEIPTS).

The WEIPVS 102 includes a location system 110, for example a GPS receiver. In some embodiments, the GPS receiver 110 is capable of accessing a storage device 112, for example, an internal memory, an internal hard disk drive, an external drive or memory, or the like. Map software and/or GPS subscription information may be stored at the storage device 112 for use by the GPS receiver 110. In the illustrated embodiment, the GPS receiver 110 is a two-way GPS receiver. The storage device 112 also stores one or more applications 114. The applications 114 include mapping applications, graphical user interface (GUI) applications, inventory transfer request applications, inventory management applications, combinations thereof, and the like. A processor 116 associated with the WEIPVS 102 executes the applications 114 and/or other computer readable instructions. Upon execution of the applications 114 and/or the computer readable instructions, the WEIPVS 102 performs some or all of the functions described herein with respect to the WEIPVS 102.

A company or technician may purchase a wireless data subscription to allow data communications between the WEIPVS 102 and the wireless network 104, a WEIPVS associated with another technician (not illustrated), the data center 106, the WEIPTS 108, and/or other systems and networks (not illustrated). The WEIPVS 102 communicates wirelessly with external systems and/or devices via a wireless transceiver 118.

The WEIPVS 102 includes an inventory management device 120, e.g., a radio frequency identification (RFID) reader with an internal storage device or access to an external storage device. In some embodiments, the inventory management device 120 accesses the storage device 112 to store and/or retrieve data associated with the inventory management device 120.

The WEIPVS 102 also includes a display 122, for example, a monitor or other graphical display. In some embodiments, the display 122 includes touch screen capability, for example, a touch screen keyboard or other input system. In some embodiments, the WEIPVS 102 also includes one or more input devices 124 by which a user interfaces with the WEIPVS 102. The input devices 124 include, for example, an external keyboard, mouse, or other input and/or selection device.

The WEIPVS 102 also includes a communication device such as an RF communication device 126 for communicating with the WEIPTS 108. In some embodiments, the RF communications device 126 includes a short-, medium-, and/or long-range RF communications device for communicating with the WEIPTS 108. In some embodiments, the RF communications device 126 includes a chipset, an antenna, and/or other hardware and/or software.

In some embodiments, the WEIPVS 102 includes a local database (not illustrated). In the illustrated embodiment, the functions of the local database are performed by the storage device 112. The storage device 112 also stores additional information, for example, an address book and software. In some embodiments, the software includes inventory tracking software and WEIP software. The inventory tracking software tracks inventory at a vehicle with which the WEIPVS 102 is associated, and the WEIP software provides the WEIPVS 102 with the capability of queuing CPE status notifications, as will be explained below.

In some embodiments, the DC 106 includes hardware and/or software for performing tasks associated with the WEIP system 100. For example, the hardware and/or software associated with the DC 106 tracks inventory of a WEIPVS 102. It should be understood, however, that a DC 106 can track inventory of more than one WEIPVS's.

In some embodiments, the DC 106 includes a dispatch management system 128 (DMS), a CPE/Accessory management system 130 (CPEAS), and a vehicle location tracking system 132 (VLTS). While the functions of the DMS 128, the CPEAS 130, and the VLTS 132 will be described as three separate entities, it should be understood that the functions of the DMS 128, the CPEAS 130, and the VLTS 132 can be provided by one or more hardware and/or software components.

The DMS 128 includes a storage device and a processor. The DMS 128 stores data relating to all orders and/or "customer tickets," resolution of which will require the dispatch of a technician. Since a technician will be dispatched to the customer location, each order or "customer ticket" potentially may represent consumption of a number of CPE's and/or CPE accessories, which may be estimated, or may reflect actual ordered parts.

The CPEAS 130 includes a storage device and a processor. The CPEAS 130 stores data relating to CPE and/or CPE accessory inventories and inventory status. In some embodiments, the CPEAS 130 is in communication with a procurement system such that records relating to a CPE and/or CPE accessory are established via an order record, an invoice record, a shipping notice, a notice of receipt, or other record generated by a manufacturer of the CPE and/or CPE accessory, and/or an entity receiving the CPE and/or CPE accessory.

In some embodiments, inventory of all CPE's and/or CPE accessories are tracked using an RFID tag. In some embodiments, each CPE and/or CPE accessory has a unique serialized RFID tag. When the CPE and/or the CPE accessory is first delivered to a storage facility, the RFID tag is scanned by a system capable of reading RFID tags. Data relating to the CPE and/or CPE accessory is stored at a storage device associated with the CPEAS 130, for example, a disk drive, a memory, a database, or the like. The data includes an indication of the current storage location of the CPE and/or the CPE accessory.

When the CPE and/or the CPE accessory is moved, the RFID again is scanned, and the storage location associated with CPE and/or the CPE accessory is updated at the CPEAS 130. When the CPE and/or the CPE accessory is loaded onto a technician vehicle, the storage location associated with the CPE again is updated at the CPEAS 130. As such, the storage location associated with a CPE and/or a CPE accessory is kept current based upon the most recent scan.

The VLTS 132 includes a storage device and a processor. The VLTS 132 tracks a physical location and/or a network address of all technician vehicles monitored by the VLTS 132. The VLTS 132 receives location updates from GPS receivers and/or transceivers installed at the technician vehicles.

In some embodiments, the WEIPTS 108 is a mobile device such as, for example, a handheld mobile communications device with wireless voice and data capabilities. In some embodiments, the WEIPTS 108 includes a smart phone, a communications-enabled PDA, a communications-enabled laptop computer, or other portable computing device with communications capability.

The WEIPTS 108 includes a processor 134 for controlling, executing, and/or processing data. A memory 136 interfaces with the processor 134 and stores data. The data stored by the memory 136 includes computer-readable instructions for execution by the processor 134. The computer-readable instructions include, for example, applications 138.

The applications 138 include, for example, location applications, navigation applications, web browsing software, feedback applications, text input software, mapping software, audio player software, video playback software, voicemail software, audio playback software, user interface (UI) applications, music player software, email software, messaging software, inventory control applications, inventory transfer applications, combinations thereof, and the like.

The WEIPTS 108 includes a communications component 140. The communications component 140 interfaces with the processor 134 to facilitate wired/wireless communications with external systems including, for example, the communications network 104, one or more WEIPVS's 102, one or more DC's 106, one or more CPEAS's 130, VoIP networks, local area networks (LAN's), wide area networks (WAN's), metropolitan area networks (MAN's), personal area networks (PAN's), and/or other devices and networks. In some embodiments, the communications component 140 supports various wireless communication protocols, for example, WIFI®, WIMAX®, BLUETOOTH®, near-field communications (NFC), infrared, infrared data association (IRDA), other radio frequency (RF) applications, combinations and/or improvements thereof, and the like.

In some embodiments, the communications component 140 supports cellular communications via different cellular technologies. For example, the communications component 140 includes a first cellular transceiver that operates in one mode, for example, GSM, and an Nth transceiver that operates in a different mode, for example, UMTS.

The WEIPTS 108 includes a display 142 for displaying multimedia such as, for example, text, images, video, telephony functions such as Caller ID data, setup functions, menus, music, metadata, messages, inventory data, transfer request acceptance message, transfer request rejection messages, wallpaper, graphics, Internet content, advertisements or other promotions, device status, preferences settings, map data, navigation data, location data, and the like.

The WEIPTS 108 also includes a communications device such as an RF device 144 for communicating with the WEIPVS 102, e.g., via the RF communications device 126. In some embodiments, the WEIPTS 108 functions as a graphical user interface (GUI) for the WEIPVS 102. As such, in some embodiments of the WEIPS 100, the WEIPTS 108 functions as the display 122 and/or input device for the WEIPVS 102 instead of, or in addition to, the display 122 illustrated in FIG. 1. In some embodiments, the functions of the RF device 144 are included in and/or performed by the communications component 140.

In some embodiments, the mobile device is configured for use as a mobile device, and not solely as the WEIPTS 108. As such, the mobile device is configured for sending and receiving data and/or voice communications via the communication component 140.

Figure 2:
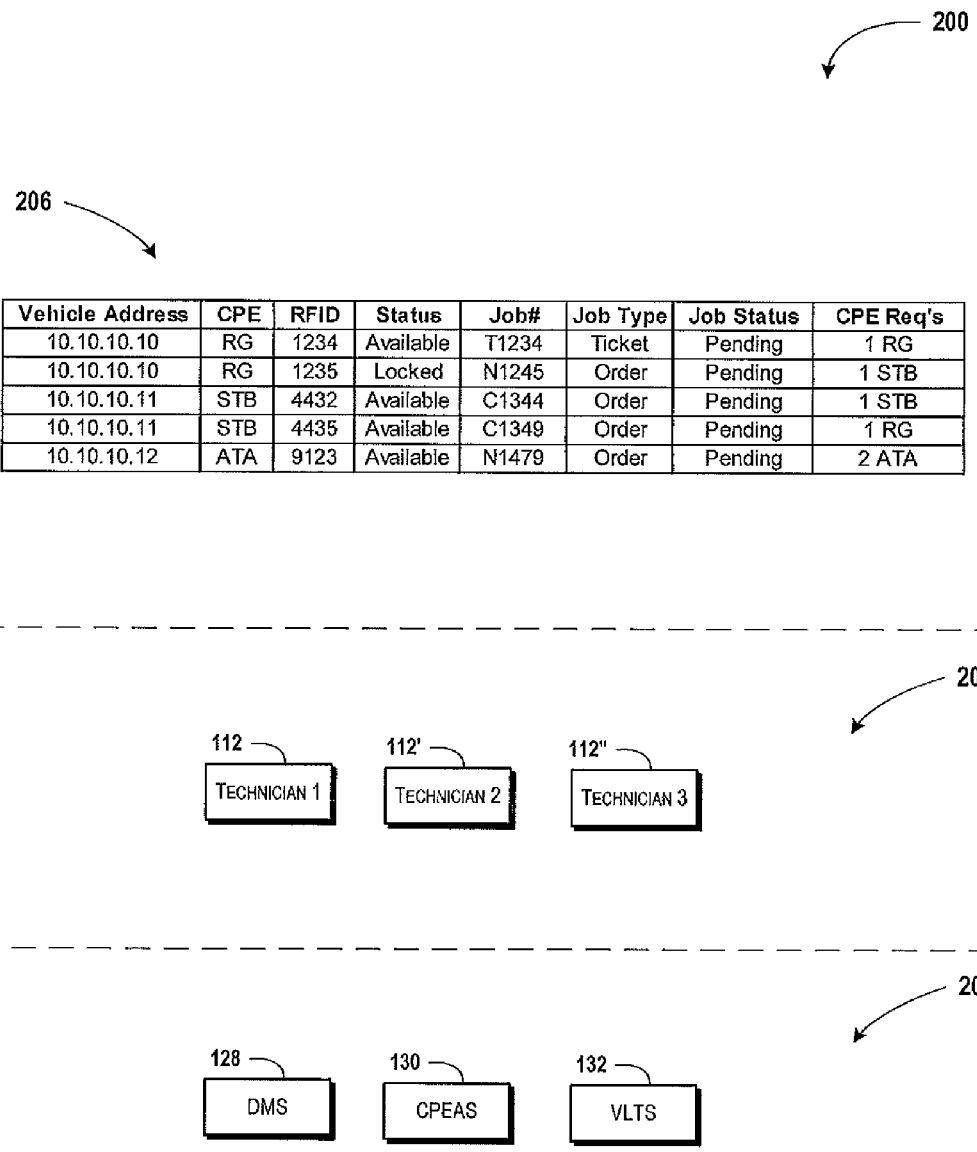
FIG. 2 schematically illustrates a layered data architecture, according to an exemplary embodiment of the present disclosure.

FIG. 2 schematically illustrates a layered data architecture 200 for a WEIP system, according to an exemplary embodiment of the present disclosure. The layered data architecture 200 is conceptual, and is included solely to further clarify the concepts of the present disclosure, and not for limiting the scope of the disclosure and/or claims.

The layered data architecture 200 includes a local data stores layer 202 and a centralized data stores layer 204. The centralized data stores layer 204 includes the DMS 128, the CPEAS 130, and the VLTS 132. The local data stores layer 202 includes local data stores 112, 112', 112" associated, respectively, with each of three service technician vehicles. It should be understood that more than three service technician vehicles and associated local data stores are possible. Additionally, the data stores may be remote from the respective technician vehicles.

Based upon data stored at the local data stores layer 202 and the centralized data stores layer 204, a data view 206 is generated. In some embodiments, the data view is generated by the WEIPVS 102, the WEIPTS 108, and/or a device in communicative connection with the CPEAS 130.

As illustrated in FIG. 2, the data view 206 includes multiple columns and rows. The WEIPVS 102, the WEIPTS 108, and/or a device in communicative connection with the CPEAS 130 obtains a vehicle address from a network address book data store (NAB). In some embodiments, the vehicle address is an IP address associated with a technician vehicle that is proximate the current location of the WEIPVS 102. Each technician's job assignment is fetched from the DMS 128. The DMS 128 stores data indicating the CPE's and/or CPE accessories needed by a technician, the Job# and/or Job type, and the CPE requirements for a particular job. The CPEAS 130 stores additional information, for example, the associated RFID information for inventoried CPE's and/or CPE accessories and a job status for each job. As will be explained below, the status of each job is updated periodically by a technician and/or a device associated with the technician, e.g., the WEIPVS 102 and/or the WEIPTS 108.

The local data stores 112, 112', 112" store information relating to technician vehicle inventory. The data stores 112, 112', 112" are updated when CPE's and/or CPE accessories are loaded into a technician vehicle and scanned by the inventory management device 120, for example, an RFID Reader. The attributes of the CPE and/or CPE accessory, e.g., the CPE type, the associated RFID data, the status, and the like, are logged into the technician vehicle data store 112, 112', 112". The logged information also can be sent to the CPEAS 130 via a wireless communications link, as will be explained in more detail below.

Turning now to the data view layer 206, the data view layer 206 creates a data view to allow an authorized entity, e.g., a service technician or dispatch center staff person, to view CPE and/or CPE accessory inventories, statuses, location information, ticket information, order information, job status, and additional information. The WEIPVS 102, the WEIPTS 108, and/or a device in communicative connection with the CPEAS 130 fetches the data from the local data stores layer 202 and the centralized data stores layer 204, and formats the data into the data view 206.

The data view 206 can be presented in any desired format. For example, the data view 206 is sometimes presented as a centralized collaborative view. In the centralized collaborative view, all data elements of the view are fetched from the local data stores layer 202 and the centralize data stores layer 204. In some embodiments, the data view 206 is presented as a localized collaborative view. In the localized collaborative view, a portion of the data elements of a view are fetched from a group of technician vehicles' local data stores. In some embodiments, the dispatch center staff is authorized to determine what centralized collaborative view or localized collaborative view each service technician is entitled to retrieve and/or view.

Figure 3:
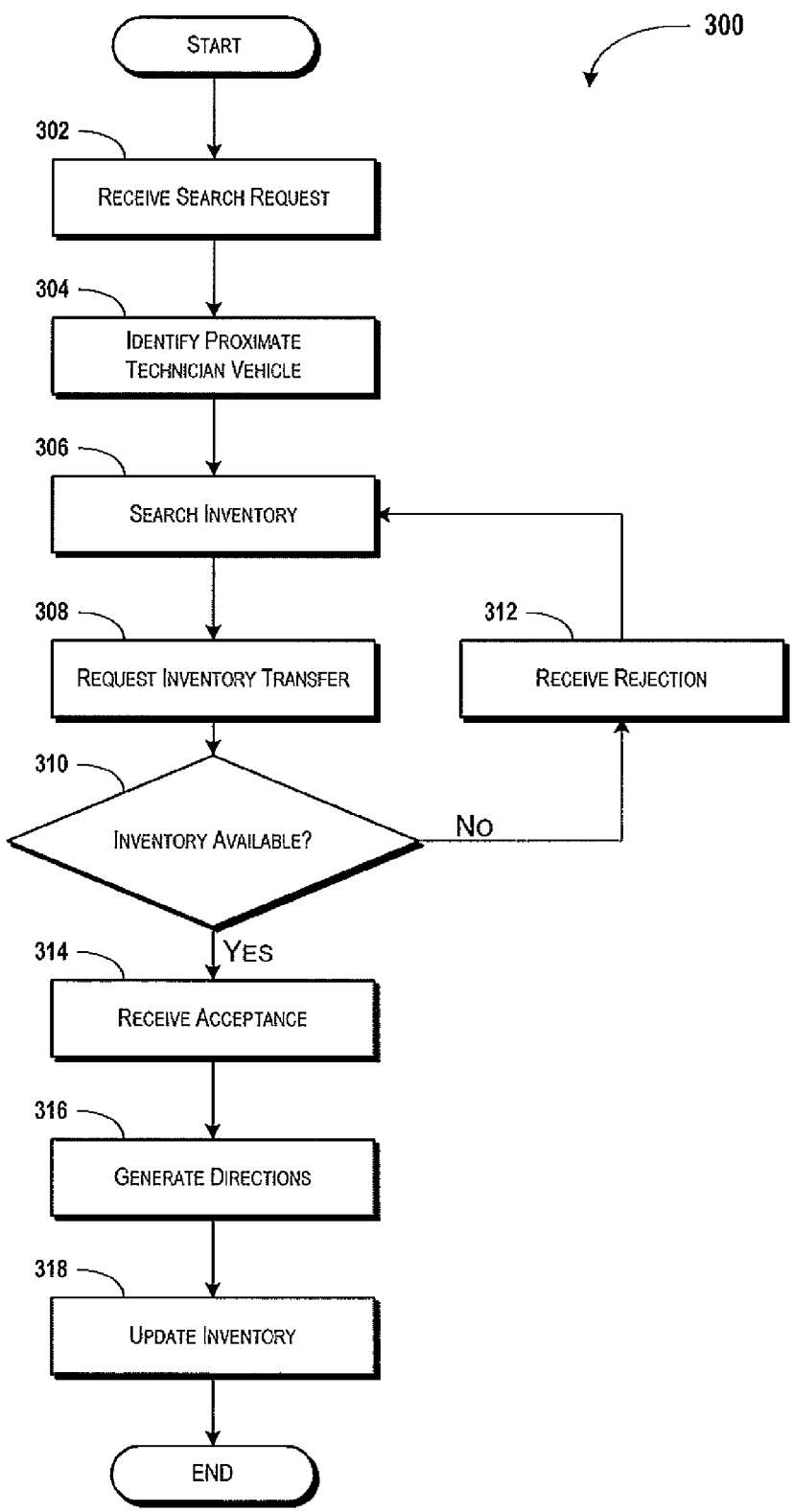
FIG. 3 schematically illustrates a method for providing wireless enabled inventory peering, according to an exemplary embodiment of the present disclosure.

FIG. 3 schematically illustrates a method 300 for providing wireless enabled inventory peering among field technicians via a centralized management system, according to an exemplary embodiment of the present disclosure. It should be understood that the steps of the method 300 are not necessarily presented in any particular order and that performance of some or all of the steps in alternative orders is contemplated. The steps have been presented in the demonstrated order for ease of description and illustration. In some embodiments, the method 300 includes additional and/or alternative steps. In some embodiments, the illustrated steps are performed simultaneously. In some embodiments of the present disclosure, some or all steps of the method 300, and/or substantially equivalent steps, are performed by execution of computer-readable instructions included on a computer-readable medium, as defined above. In some embodiments, the computer-readable instructions are stored in the storage device 112, in the memory 136, in the CPEAS 130, alternative locations, and/or in a combination thereof.

In the illustrated method 300, each technician vehicle is equipped with an inventory management device 120, for example an RFID reader, a location system 110, for example a two way GPS receiver, and mapping capabilities. A storage device such as, for example, a local database, memory, and/or hard drive, can be accessed by the inventory management device 120 and/or the GPS receiver 110.

Additionally, each technician in the described method 300 is equipped with a WEIPTS 108, for example a mobile device. In some embodiments, the WEIPTS 108 is configured to function as an extension of the GPS receiver 110 and/or to communicate with the GPS receiver 110 via an RF link. The RF link can be established between the RF device 144 and the RF device 126, the communication component 140 and the wireless transceiver 118, combinations thereof, and/or alternative components. The WEIPTS 108 additionally can be configured with hardware and/or software for providing communications via a cellular communications network operating in accordance with one or more of a 2G, 3G, and/or 4G protocol, or improvements thereof.

While loading CPE's and/or CPE accessories into the technician vehicle, the inventory management device 120 associated with the vehicle is used to track changes to the inventory associated with the technician vehicle. For example, if a CPE is loaded into or removed from a technician vehicle, the inventory for that particular type and/or category of CPE can be incremented or decremented by one by the WEIPVS 102, and/or a component thereof. It should be understood that loading and/or removing inventory can be sensed by scanning the inventory, e.g., using the inventory management device 120, the WEIPTS 108, and/or another device to scan or enter a bar code or other identification information.

In some embodiments, inventory data for the technician vehicle is stored in a local storage device 112, for example, a local database. Additionally, or alternatively, an inventory associated with the technician vehicle is stored by a centralized inventory management system, for example, the CPEAS 130. As such, when a CPE and/or CPE accessory is loaded into or removed from the technician vehicle, the WEIPVS 102 communicates with a CPEAS 130 to update the inventory data for that particular type and/or category of CPE.

In some embodiments, the WEIPVS 102 communicates with the CPEAS 130 via a communication link provided by a cellular data connection, a short-, med-, and/or long-range RF device, e.g., a WIFI hotspot, and/or other wired or wireless software and/or hardware. The CPEAS 130 increments the appropriate inventory data as instructed by the WEIPVS 102. It should be understood that the communications link can include one or more of a 2G, 3G, and/or 4G cellular connection, and that various filtering mechanisms can be used in conjunction with the RFID reader.

The GPS receiver 110 in each technician vehicle receives GPS satellite signals and calculates the location of the technician vehicle. In some embodiments, the GPS receiver 110 is configured to operate using standard GPS and/or assisted GPS (A-GPS) systems and methods. In some embodiments, the GPS receiver 110 also is configured to interact with a cellular communication network for reception of cellular signals for use in determining location when the GPS receiver 110 is unable to obtain a satellite fix. The GPS receiver 110 includes hardware and software for providing a map display and allowing a user to interact with the GPS receiver 110 via a touch screen, stylus, and/or other input devices. In some embodiments, the GPS receiver 110 transmits location information associated with a technician vehicle to a centralized vehicle tracking system, for example, the VLTS 132. The location information is transmitted upon occurrence of a trigger event, e.g., arrival at a customer site, ignition of the technician vehicle engine, scanning of a CPE and/or CPE accessory at the inventory management device 120; at certain times of day, e.g., 8:00 AM, 11:30 AM, 2:00 PM, and/or other times; and/or at desired intervals, e.g., 500 ms, 1 second, 5 seconds, 10 seconds, 30 seconds, 1 minute, 5 minutes, 10 minutes, 30 minutes, and/or any other desired time intervals. Additionally, or alternatively, the location information is received on-demand by a requestor and/or a user and is transmitted as needed to a tracking system, for example, the VLTS 132.

For purposes of describing the method 300 clearly, but not for purposes of limiting the disclosure in any way, it is assumed that prior to the method 300 commencing, the following exemplary scenario exists. A first technician vehicle being used by a first technician ("Tech1") is loaded with supplies expected to be needed for the scheduled orders and/or "customer tickets." Tech1 travels to a customer location to install the CPE and/or the CPE accessory associated with an order and/or "customer ticket."

A second technician ("Tech2") and a third technician ("Tech3") are in the field for other installation and/or service jobs at other customer locations. Second and third technician vehicles associated with Tech2 and Tech3, respectively, are provisioned in a manner similar to that described above with respect to the first technician vehicle associated with Tech1.

Tech1 removes a CPE and/or CPE accessory for installation at a customer location. As Tech1 removes CPE's and/or CPE accessories from the first technician vehicle, Tech1 scans the CPE's and/or the CPE accessories using an inventory management device 120, e.g., an RFID reader. It should be understood that the functions of the inventory management device 120 are performed, in some embodiments, by hardware and/or software residing on the WEIPTS 108, and reported to the WEIPVS 102 or another system and/or device. When Tech1 scans the CPE's and/or the CPE accessories, an inventory control system, e.g., the WEIPVS 102 associated with the first technician vehicle detects the removal of the CPE's and/or the CPE accessories and logs the new status of detected RFID inventories in the storage device 112. Additionally or alternatively, the RFID information associated with the scanned CPE's and/or CPE accessories is sent to the DC 106 and/or an inventory management system of the DC 106, e.g., the CPEAS 130 for inventory tracking purposes.

The CPEAS 130 updates the storage location and/or the status associated with the CPE's and/or the CPE accessories. In some embodiments, for example, the CPEAS 130 updates a status associated with the CPE's and/or the CPE accessories to "ready to be installed," and/or updates a storage location associated with the CPE's and/or the CPE accessories to "installed at customer location."

For purposes of illustrating the method 300, it is assumed that Tech1 was able to upsell at least one CPE and/or CPE accessory at the customer location. Tech1 attempted to retrieve the upsold CPE and/or CPE accessory from the technician vehicle, but realized that the first technician vehicle inventory of the upsold CPE and/or CPE accessory was zero, i.e., the technician vehicle did not have the necessary CPE's and/or CPE accessories. Alternatively, the first technician vehicle inventory of the upsold CPE and/or CPE accessory is greater than zero, but the inventory is needed for other service/installation jobs. At this point, the method 300 as illustrated commences. It should be understood that the method 300 can be used in any scenario in which a technician vehicle is lacking a needed CPE and/or CPE accessory, and is not limited to the exemplary scenario described above.

The method 300 begins, and flow proceeds to block 302, wherein the WEIPVS 102 associated with Tech1 receives a request to search for technician vehicles proximate Tech1's technician vehicle. In some embodiments, the search request is requested, for example, by Tech1 invoking a mapping application associated with the WEIPVS 102. The mapping application is invoked at the WEIPVS 102 or via the WEIPTS 108. In some embodiments, Tech1 is prompted to define a search area via a graphical user interface (GUI) and/or by text or form input. In some embodiments, for example, Tech1 defines a search area by drawing a line, e.g., a circle, on the map using an electric pen or touch/multi-touch interface. In some embodiments, Tech1 enters a digit corresponding to a number of miles, kilometers, and/or portions thereof to define the search area.

At block 304, the WEIPVS 102 communicates with the VLTS 132 to identify proximate technician vehicles. For example, GPS receiver 110 generates a query to the VLTS 132 or other tracking system to obtain all technician vehicles within the defined search area. The proximate technician vehicles are identified, and as illustrated at block 306, Tech1, the WEIPVS 102, and/or the WEIPTS 108, searches an inventory associated with a proximate technician vehicle. For example, Tech1, the WEIPVS 102, and/or the WEIPTS 108 views the inventory and/or generates queries for a needed CPE and/or CPE accessory via the WEIPVS 102 and/or the WEIPTS 108. Similarly, Tech1, the WEIPVS 102, and/or the WEIPTS 108 views the inventories and/or the query results via the WEIPVS 102 and/or the WEIPTS 108.

It should be understood that Tech1, the WEIPVS 102, and/or the WEIPTS 108 is able to view each proximate technician vehicle's complete inventory and/or to narrow the search by selecting or defining specific search criteria, e.g., by selecting a particular CPE and/or CPE accessory via a menu option. Tech1, the WEIPVS 102, and/or the WEIPTS 108 searches for the needed CPE and/or CPE accessory. Upon locating the needed CPE and/or CPE accessory, Tech1, the WEIPVS 102, and/or the WEIPTS 108 examines the status of the CPE and/or CPE accessory to determine if the CPE and/or CPE accessory is "available" or "locked."

As illustrated at block 308, Tech1, the WEIPVS 102, and/or the WEIPTS 108 locates the needed CPE and/or CPE accessory, notes that the status of the needed CPE and/or CPE accessory is "available," and requests transfer of the desired CPE and/or CPE accessory to Tech1's inventory. The request is passed to the CPEAS 130, and the CPEAS 130 delivers the request to Tech2 via a WEIPTS, mobile device, and/or WEIPVS associated with Tech2.

As illustrated at block 310, Tech2 and/or a WEIPTS or WEIPVS associated with Tech2 determines if the requested CPE and/or CPE accessory is available. If not, the method 300 proceeds to block 312, whereat Tech2 rejects the request. For example, Tech2 may be in the process of upselling the requested CPE and/or CPE accessory, may be about to return home for the day, or may have other motivations for not sharing the requested CPE and/or CPE accessory. The rejection is received by the CPEAS 130 and relayed to Tech1 via the WEIPVS 102 and/or the WEIPTS 108. Flow returns to block 306, whereat Tech1 searches an inventory associated with a proximate vehicle. After again identifying the needed CPE and/or CPE Accessory, flow returns to block 308, whereat Tech1 sends a request designated for Tech3, indicating that Tech1 needs a CPE and/or CPE accessory. As explained above, the request may be transmitted to the CPEAS 130 via the WEIPTS 108 and/or the WEIPVS 102. The CPEAS 130 sends a request to Tech3, which is received by Tech3 via a WEIPTS and/or WEIPVS associated with Tech3.

As illustrated at block 310, Tech3 accepts the reservation request since Tech3 does not need or anticipate needing the requested CPE and/or CPE accessory. In some embodiments, Tech3 accepts the reservation request via a WEIPTS and/or the WEIPVS associated with Tech3. As illustrated at block 314, Tech 1 receives an acceptance from Tech3, which can be relayed by the WEIPVS associated with Tech3. In addition to informing Tech1 that the needed CPE and/or CPE accessory is available, Tech3 updates the CPE and/or CPE accessory status from "available" to "reserved."

The WEIPVS and/or the WEIPTS associated with Tech3 sends an inventory update message to the CPEAS 130. The CPEAS 130 updates the CPE and/or CPE accessory status to "reserved." In some embodiments, a timer is started, for example a tinier that expires after a number of minutes and/or hours pass. If Tech1 does not retrieve the CPE and/or CPE accessory within the allotted time, the status of the CPE and/or CPE accessory is changed from "reserved" to "available," and the CPEAS 130 again may be updated by the WEIPVS and/or WEIPTS associated Tech3.

As illustrated at block 316, the WEIPVS 102 receives a request to generate directions to Tech3's technician vehicle. The WEIPVS 102 generates directions to Tech3's technician vehicle. In some embodiments, the location component 110 determines the location of Tech1's vehicle and receives the location of Tech3's technician vehicle from the WEIPVS 102 or from the VLTS 132. The location component 110 generates directs to Tech3's vehicle and provides Tech1 with navigation instructions, e.g., turn-by-turn directions, to reach Tech3's technician vehicle. Tech1 navigates Tech1's technician vehicle to Tech3's technician vehicle.

Although not illustrated in FIG. 3, the needed CPE and/or CPE accessory is passed to Tech1. In some embodiments, an inventory management device associated with Tech3's vehicle detects the action and updates a local inventory status associated with the CPE and/or CPE accessory to "transferred." In some embodiments, Tech3 receives an alert from a WEIPVS associated with Tech3's technician vehicle. The received alert includes, for example, an audio, visual, and/or tactile alert warning Tech3 that the CPE and/or CPE accessory is being transferred away from Tech3's technician vehicle. In some embodiments, the status of the CPE and/or CPE accessory is updated at the CPEAS 130. In some embodiments, Tech1 receives an audio, visual, and/or tactile alert.

As illustrated at block 318, Tech 1 puts the CPE and/or CPE accessory in the first technician vehicle. The inventory management device 120 detects the action and updates the inventory data stored at the storage device 112. In some embodiments, the inventory status is updated to "new inventory," "available," or "locked." Additionally, the WEIPVS 102 transmits an inventory status update message to the CPEAS 130, which updates an inventory status associated with the CPE and/or CPE accessory. In some embodiments, after the CPE and/or CPE accessory is successfully transferred to Tech1's inventory, Tech3 receives a notification that the inventory transfer is complete. In some embodiments, a persisting warning is provided to Tech3. The persisting warning is removed after this notification is received. Although not illustrated, Tech 1 returns to installation site and installs the CPE and/or the CPE accessory or keeps the new inventory for another day and/or installation assignment. The method 300 ends.

While not illustrated herein, it should be understood that in some embodiments, Tech3 travels to Tech1 to deliver the CPE and/or CPE accessory. For example, Tech3 intended to travel to an installation site near Tech1's current location, Tech3 has completed all of his/her tasks for the day, or other circumstances allowed Tech3 to travel to Tech1.

Figure 4:
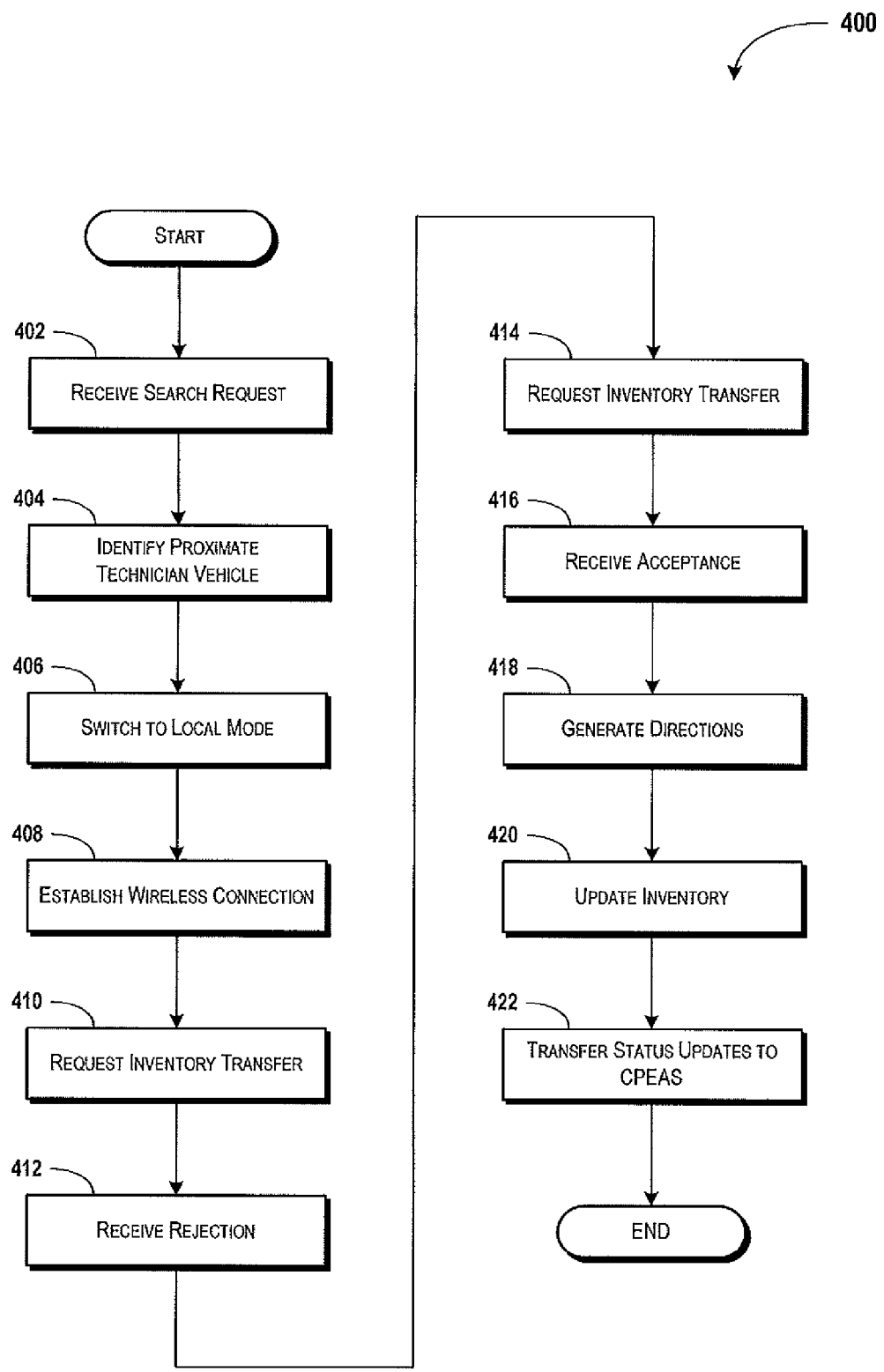
FIG. 4 schematically illustrates a method for providing wireless enabled inventory peering, according to another exemplary embodiment of the present disclosure.

FIG. 4 schematically illustrates a method 400 for providing wireless enabled inventory peering among field technicians via a decentralized management system, according to an exemplary embodiment of the present disclosure. It should be understood that the steps of the method 400 are not necessarily presented in any particular order and that performance of some or all of the steps in an alternative order(s) is contemplated. The steps have been presented in the demonstrated order for ease of description and illustration. In some embodiments, the method 400 includes additional and/or alternative steps. In some embodiments, the illustrated steps are performed simultaneously. In some embodiments of the present disclosure, some or all steps of the method 400, and/or substantially equivalent steps, are performed by execution of computer-readable instructions included on a computer-readable medium, as described above.

The method 400 is described as occurring in a scenario substantially similar to the scenario described with respect to the method 300, i.e., Tech1 is at an installation site and determines that the technician vehicle inventory is short of a CPE and/or CPE accessory. It should be understood, however, that the method 400 can be used in any scenario in which a technician is lacking a needed CPE and/or CPE accessory, and is not limited to the exemplary scenario described above.

The method 400 begins, and flow proceeds to block 402, wherein the WEIPVS 102 receives a request to search for proximate technician vehicles. As illustrated at block 404, the WEIPVS 102 contacts the VLTS 132 to retrieve a list of proximate technician vehicles, with a search area being defined by Tech1 or a system setting and/or preference. Identification information associated with the proximate vehicles, e.g., IP addresses, telephone numbers, technician vehicle ID's, and/or other identifying information, is obtained and stored by the WEIPVS 102 and/or the WEIPTS 108.

Tech1, the WEIPVS 102, and/or the WEIPTS 108 attempts to view an inventory associated with a proximate vehicle, but in the embodiment illustrated in FIG. 4, the WEIPVS 102 is unable to establish a wireless connection with the CPEAS 130 to view the inventory. As illustrated at block 406, the WEIPVS 102 is switched to a "local mode," for example by Tech1 selecting a "local mode" option or button. It is contemplated that the WEIPVS 102 operates in the "local mode" as a default mode, by command of an authorized party, and/or under other circumstances other than the WEIPVS 102 being unable to establish a connection to the CPEAS 130. Tech1, the WEIPVS 102, and/or the WEIPTS 108 again requests to review an inventory associated with an identified proximate vehicle. As explained above, the request to review inventory can include a request to review an entire inventory, a query for a particular CPE and/or CPE accessory, a query for a particular category of parts, and the like.

As illustrated at block 408, the WEIPVS 102 and/or the WEIPTS 108 establishes a wireless connection with a storage device associated with the proximate vehicle. It should be understood that the WEIPVS 102 establishes a direct data link with the storage device associated with the proximate vehicle via a wireless connection. In some embodiments, the wireless connection includes a 2G, 3G, and/or 4G connection via the communications network 104, and the connection is established by referencing the identification information obtained and stored as described above with reference to block 404. Through the established connection, Tech1, the WEIPVS 102, and/or the WEIPTS 108 is/are able to view the inventory associated with one or more proximate vehicles.

As illustrated at block 410, Tech1, the WEIPVS 102, and/or the WEIPTS 108 requests to transfer a CPE and/or a CPE accessory from a first proximate vehicle inventory (Tech2's inventory) to Tech1's inventory. Tech2 is alerted by a WEIPVS and/or WEIPTS associated with Tech2's vehicle and indicates that Tech2 does not wish to share the requested CPE and/or CPE accessory. For example, Tech2 may be in the process of upselling the requested CPE and/or CPE accessory, may be about to return home for the day, or may have other motivations for not sharing the requested CPE and/or CPE accessory.

As illustrated at block 412, Tech1 receives a rejection from Tech2 via the WEIPVS 102 and/or the WEIPTS 108. As illustrated at block 414, Tech1, the WEIPVS 102, and/or the WEIPTS 108 establishes a connection with another nearby technician vehicle (in this case driven by Tech3) or associated device, searches an inventory associated with Tech3's technician vehicle, identifies the needed CPE and/or CPE accessory, and requests an inventory transfer. The inventory transfer request is transmitted from Tech1 to Tech3 via a wireless connection.

As illustrated at block 416, Tech1 receives an acceptance request from Tech3. The acceptance request is received via the WEIPVS 102 and/or the WEIPTS 108. A timer can be started as explained above with reference to FIG. 3 to set a time limit within which Tech1 is allowed to retrieve the CPE and/or CPE accessory, and Tech1 is notified via the wireless connection. In some embodiments, the WEIPVS associated with Tech3 attempts to update the CPEAS 130. In the illustrated embodiment, a connection with the CPEAS 130 is not available, so the updating does not occur at this time.

At block 418, the WEIPVS 102 generates navigation instructions from Tech1's location to Tech3's location. Though not illustrated in FIG. 4, Tech1 navigates to Tech3 and moves the inventory from Tech3's vehicle to Tech1's vehicle. As discussed above with reference to FIG. 3, the inventory is moved to Tech1's vehicle and the respective inventories are updated as needed. The CPEAS 130 is not updated, since the WEIPVS 102 and the WEIPVS associated with Tech3 are not able to establish a wireless communications link with the CPEAS 130. Although not illustrated, Tech1 returns to the installation site and installs the CPE and/or CPE accessory. In some embodiments, Tech3 travels to Tech1 to deliver the CPE and/or CPE accessory. For example, Tech3 intended to travel to an installation site near Tech1's current location, Tech3 has completed all of his/her tasks for the day, or other circumstances allowed Tech3 to travel to Tech1.

As illustrated at block 420, when the WEIPVS 102 and/or the WEIPVS associated with Tech3 is available to establish a wireless communications link with the CPEAS 130, the inventories managed by the CPEAS 130 are updated. It should be appreciated that multiple inventory update messages may be queued during the method 400. As such, as illustrated at block 422, multiple messages may be delivered when a wireless communication link is again available. The method 400 ends.

It should be appreciated that the present disclosure introduces systems and methods for allowing a technician to efficiently check if one or more of the near-by technician vehicle (s) has inventory to meet his/her need. The present disclosure further introduces systems and methods for maintaining accuracy of inventories associated with one or more technician vehicles.

In some embodiments of the present disclosure, a technician is able to restock insufficient CPE's and/or CPE accessories inventories from nearby technician vehicles. Since the technician is able to replenish CPE's and/or CPE accessories inventories, the technician is able to complete additional job assignments. In some embodiments, the ability to query inventories associated with nearby technician vehicles allows for reduction of installation costs and improvement of technician productivity, thereby improving customer satisfaction.

In some embodiments, incentives for technicians to upsell CPE's, CPE accessories, and/or associated systems and/or services are provided by a carrier, a contract company, and/or another entity. Technicians are able to upsell CPE's, CPE accessories, and/or associated systems and/or services without regard for inventory levels in the technician vehicle associated with the technician. If a technician is able to upsell additional CPE's, CPE accessories, and/or associated systems and/or services, revenue can be increased.

Since systems and methods of the present disclosure enable technicians to collaborate to a greater degree than other systems and methods, improved technician knowledge sharing and camaraderie is expected to result. Additionally, technicians are able to resolve inventory shortages with reduced dispatch center resource needs, e.g., human resources, bandwidth, system usage, and the like. As such, additional cost savings and productivity improvements are expected to result from implementation of systems and methods according to the present disclosure.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A system, for providing wireless enabled inventory peering, comprising:
a first wireless enabled inventory peering vehicle subsystem being associated with a first technician vehicle and comprising a first processor and first computer-readable instructions that, when executed by the first processor, cause the first processor to perform operations comprising:
receiving an inventory search request; and
in response to receiving the inventory search request:
identifying a second technician vehicle being within a predetermined search area;
searching data indicating an inventory located on the second technician vehicle;
generating an inventory-transfer request for transfer of an inventory item from the inventory located on the second technician vehicle to an inventory located on the first technician vehicle;
transmitting the inventory-transfer request to a second wireless enabled inventory peering vehicle subsystem being associated with the second technician vehicle; and
updating data indicating the inventory located on the first technician vehicle in response to the inventory item being received at the first technician vehicle from the second technician vehicle.

2. The system of claim 1, further comprising a wireless enabled inventory peering technician subsystem being in operative communication with the first wireless enabled inventory peering vehicle subsystem.

3. The system of claim 2, wherein the wireless enabled inventory peering technician subsystem comprises a mobile communications device.

4. The system of claim 3, wherein the wireless enabled inventory peering technician subsystem comprises a second processor and second computer-readable instructions that, when executed by the second processor, cause the second processor to perform operations comprising receiving a first technician input and transmitting the first technician input to the first wireless enabled inventory peering vehicle subsystem.

5. The system of claim 4, wherein:
wireless enabled inventory peering technician subsystem further comprises a display; and
the second computer-readable instructions, when executed by the second processor, cause the second processor to perform a further operation of receiving an output from the first wireless enabled inventory peering vehicle subsystem and displaying at least part of the output using the display.

6. The system of claim 1, wherein the first computer-readable instructions, when executed by the first processor, cause the first processor to perform a further operation of transmitting location information corresponding to a current location associated with the first technician vehicle to the second wireless enabled inventory peering vehicle subsystem.

7. The system of claim 1, wherein the first computer-readable instructions, when executed by the first processor, cause the first processor to perform a further operation of generating directions indicating a route from a current location associated with the first technician vehicle to a location associated with the second technician vehicle.

8. The system of claim 7, further comprising a wireless transceiver for establishing a connection between the first wireless enabled inventory peering vehicle subsystem and a dispatch center, wherein the first computer-readable instructions, when executed by the first processor, cause the first processor to perform a further operation of sending, using the wireless transceiver, an inventory status change message to the dispatch center.

9. A method, for providing wireless enabled inventory peering, comprising:
   receiving, by a first wireless enabled inventory peering vehicle system associated with a first technician vehicle, an inventory search request; and
   in response to receiving, by the first wireless enabled inventory peering vehicle system, the inventory search request:
      identifying, by the first wireless enabled inventory peering vehicle system, a second technician vehicle being within a predetermined search area;
      searching, by the first wireless enabled inventory peering vehicle system, data indicating an inventory located on the second technician vehicle;
      generating, by the first wireless enabled inventory peering vehicle system, an inventory-transfer request for transfer of an inventory item from the inventory located on the second technician vehicle to an inventory located on the first technician vehicle;
      transmitting, by the first wireless enabled inventory peering vehicle system, the inventory-transfer request to a second wireless enabled inventory peering vehicle system being associated with the second technician vehicle; and
      updating, by the first wireless enabled inventory peering vehicle system, data indicating the inventory located on the first technician vehicle in response to the inventory item being received at the first technician vehicle from the second technician vehicle.

10. The method of claim 9, further comprising:
   receiving, by a wireless enabled inventory peering technician system, an output from the first wireless enabled inventory peering vehicle system; and
   displaying at least a portion of the output using a display device of the wireless enabled inventory peering technician system.

11. The method of claim 9, further comprising:
   receiving, by the first wireless enabled inventory peering vehicle system, data indicating that the inventory-transfer request is accepted; and
   generating, by the first wireless enabled inventory peering vehicle system, directions indicating a route from a current location associated with the first technician vehicle to a location associated with the second technician vehicle.

12. The method of claim 9, further comprising sending an inventory status change message to a dispatch center.

13. The method of claim 12, wherein sending the inventory status change message to the dispatch center comprises sending the inventory status change message to a consumer premises equipment/accessory management system associated with the dispatch center.

14. The method of claim 9, further comprising obtaining, by the first wireless enabled inventory peering vehicle system, location information relating to the second technician vehicle.

15. The method of claim 14, wherein obtaining, by the first wireless enabled inventory peering vehicle system, the location information relating to the second technician vehicle comprises obtaining, by the first wireless enabled inventory peering vehicle system, the location information relating to the second technician vehicle from a dispatch center.

16. The method of claim 9, further comprising:
   determining, by the first wireless enabled inventory peering vehicle system, that the first wireless enabled inventory peering vehicle system is unable to establish a communication link with a dispatch center;
   storing, by the first wireless enabled inventory peering vehicle system, an inventory item status update message in a storage device associated with the first wireless enabled inventory peering vehicle system; and
   transmitting, by the first wireless enabled inventory peering vehicle system, the inventory item status update message to the dispatch center when the first wireless enabled inventory peering vehicle system is able to establish the communication link.

17. The system of claim 1, wherein the first computer-readable instructions, when executed by the first processor, cause the first processor to identify the second technician vehicle being within the predetermined search area being defined by a distance from the first technician vehicle.

18. The system of claim 1, wherein the first computer-readable instructions that, when executed by the first processor, cause the first processor to identify the second technician vehicle being within the predetermined search area being defined by a technician input.

19. The method of claim 9, wherein identifying, by the first wireless enabled inventory peering vehicle system, the second technician vehicle being within the predetermined search area, comprises identifying the second technician vehicle being within a defined distance from the first technician vehicle.

20. The method of claim 9, wherein identifying, by the first wireless enabled inventory peering vehicle system, the second technician vehicle being within the predetermined search area, comprises identifying the second technician vehicle being within the search area wherein the search area is defined by a technician input.

* * * * *